Dec. 23, 1969  C. W. PEWTHERS  3,485,400
VEHICLE WITH SLIDING AND TILTING BED
Filed Nov. 29, 1967  6 Sheets-Sheet 5

INVENTOR
Charles W. Pewthers

BY *Strauch, Nolan, Neale, Nies & Kurz*

ATTORNEYS

Unite d States Patent Office 3,485,400
Patented Dec. 23, 1969

3,485,400
VEHICLE WITH SLIDING AND
TILTING BED
Charles W. Pewthers, 1015 Walton Drive,
College Station, Tex. 77840
Filed Nov. 29, 1967, Ser. No. 686,575
Int. Cl. B60p 1/04, 1/00
U.S. Cl. 214—505                                11 Claims

ABSTRACT OF THE DISCLOSURE

A vehicle with a multisection bed which is extendible and tiltable relative to the vehicle frame and a foot assembly pivotable downwardly relative to the vehicle frame to elevate one end of the vehicle. Fluid-operated motors effect the tilting of the bed and the movement of the foot assembly; and a fluid-operated motor-flexible link arrangement is provided to extend and retract the bed.

---

The present invention relates to trucks and other load-carrying vehicles and, more specifically, to load-carrying vehicles with a novel, extendible, tiltable bed and a novel foot assembly for elevating one end of the vehicle when it is lowered.

It is a primary object of the present invention to provide novel, improved load-carrying vehicles which are more versatile and efficient than comparable load-carrying vehicles heretofore known.

The novel vehicles of the present invention by which the foregoing and other objects of the invention are attained include a bed slidably carried by a sub-frame which in turn is pivotally fixed to the rear end of the vehicle frame. This permits the bed to be tilted upwardly and to be extended relative to the vehicle frame for loading and unloading, dumping, and the like.

Coupled with this novel bed construction is a foot assembly which is also pivotally fixed to the rear of the vehicle frame. The foot assembly can be pivoted downwardly to elevate the rear of the vehicle. This permits the dock height of the bed to be adjusted to facilitate loading and unloading and, also, permits below horizontal penetration of the bed. The foot assembly can also be lowered into engagement with the surface on which the vehicle is standing during loading, unloading, and other operations to stabilize the vehicle.

In addition to the components just described the vehicles of the present invention have a novel combination of operating and control mechanisms which permit the tilting, extension, and raising of the bed to be accomplished independently. In the preferred embodiments of the invention these mechanisms are of the fluid motor operated type. This type of operating mechanism has a number of advantages from the operational standpoint as will become apparent hereinafter. In addition it has the further advantage that the fluid system can also be readily employed to power auxiliary devices such as winches, for example, thereby further increasing the versatility of vehicles in accord with the principles of the present invention.

As suggested above and as will be apparent from the foregoing, one important advantage of vehicles constructed in accord with the principles of the present invention is the high degree of versatility they possess. Other important advantages are that they are highly efficient, have maximum strength and a long service life, and are comparatively inexpensive to operate and service.

Vehicles similar in some respects to those of the present invention have heretofore been proposed. For example, U.S. Patents Nos. 2,588,001 to Holland, 3,130,847 to Dempster, 3,138,276 to Allen, 3,159,294 to Forysthe, and 3,231,120 to Dempster all disclose vehicles with ground engaging support arrangements for stabilizing a vehicle while its bed is extended or tilted. However, these support arrangements are not capable of elevating the rear end of the vehicle as is the novel foot assembly with which the vehicles of the present invention are provided. Accordingly, these prior art arrangements are not capable of increasing the versatility of the vehicles in which they are utilized to anywhere near the same extent as the foot assembly of my invention.

U.S. Patent No. 3,074,574 to Prince is for vehicles having a bed which is extended and retracted by an arrangement similar in appearance to the mechanism employed for this purpose in the present invention. However, as will become apparent from a closer comparison of the two mechanisms, that of the present invention is considerably simpler and less subject to stress and other wear producing forces. Aside from this operating mechanism there is little similarity between the vehicle described in the foregoing patent and those of the present invention, the latter being much superior as far as versatility, simplicity, reliability, and other attributes are concerned.

Other load carrying vehicles with mechanisms similar to a limited extent to other of those preferably employed in the present invention such as the bed elevating or tilting mechanism have also heretofore been proposed. However, to date there has not been suggested anything even remotely resembling vehicles with the specific novel features and combinations thereof which provide those of the present invention with the unique and important advantages described above.

From the foregoing it will be apparent that further important objects of the present invention reside in the provision of novel, improved load carrying vehicles which possess the following attributes and various combinations thereof: a high degree of efficiency, maximum strength, long service life, low operating costs, and low maintenance costs.

Another important but more specific object of the invention resides in the provision of novel, improved load carrying vehicles having a tiltable, extendible bed, a novel mechanism for elevating the rear end of the vehicle and thereby raising the bed to facilitate load and unloading, dumping, and other operations, and a novel control arrangement which permits the tilting, extension, and raising of the bed to be effected independently.

Other important objects, further novel features, and additional advantages of the present invention will become fully apparent from the appended claims and as the ensuing detailed description and discussion proceeds in conjunction with the accompanying drawing, in which:

FIGURE 1 is a side view of a load-carrying vehicle constructed in accord with the principles of and embodying the advantages of the present invention;

FIGURES 2–6 are views similar to FIGURE 1 with the vehicle posited for various operations such as loading, unloading, dumping, and the like;

Referring now to the drawing, FIGURES 1–6 depict a novel load-carrying vehicle 20 constructed in accord with the principles of the present invention. Vehicle 20 includes a number of standard, conventional components such as a chassis or frame 22, a cab 24, and wheels 26 which will not be described further herein except as they relate to the present invention. Also incorporated in vehicle 20 are a sub-frame 28 pivotally connected to vehicle frame 22 at the rear end of the vehicle, a bed 30 slidably carried by the sub-frame, a foot assembly 32 for elevating the rear end of the vehicle and for stabilizing it during operations such as loading, unloading and the like, and a novel system including a control arrangement 34 for extending, retracting, and tilting bed 30 and for lowering foot assembly 32 to stabilize and/or raise the rear end of vehicle 20.

Figure 7:
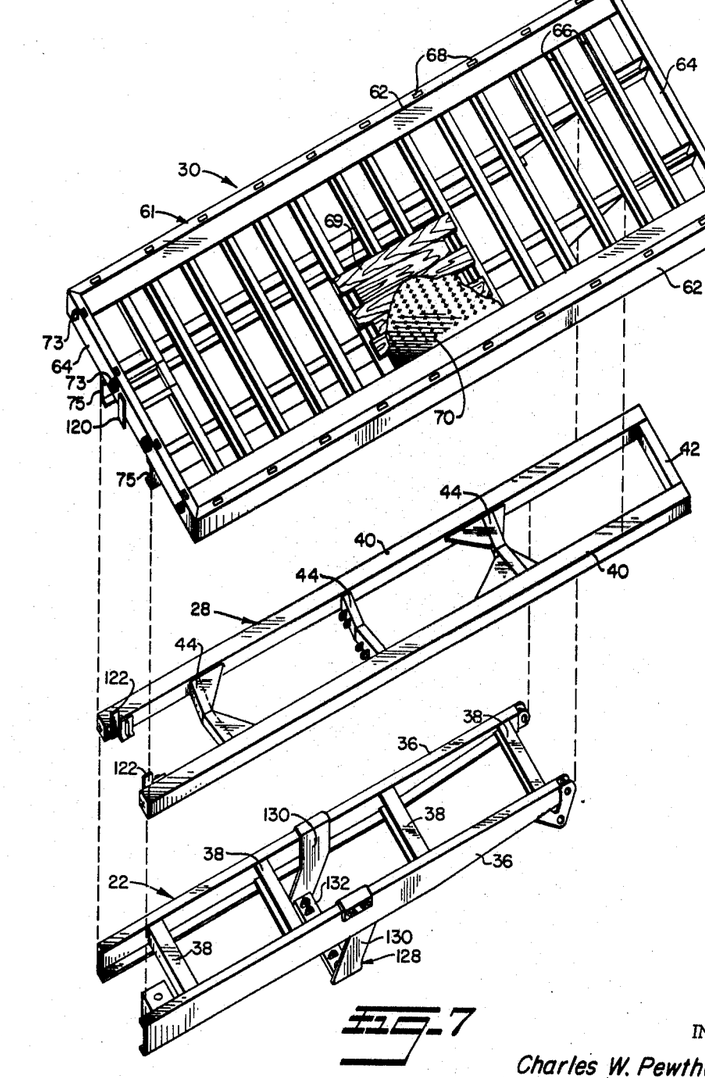
FIGURE 7 is an exploded view of the vehicle frame, a sub-frame which is pivotally fixed to the vehicle frame, and the vehicle bed, which is slidably carried by the sub-frame.

Referring next to FIGURE 7, the vehicle frame 22 on which sub-frame 28 and bed 30 are mounted will typically include a pair of longitudinally extending structural members 36 joined into a rigid, unitary unit by cross members 38. The details of these members will vary from vehicle to vehicle, which is immaterial as far as the present invention is concerned.

The sub-frame 28 carried by frame 22 is of similar construction, including two longitudinal structural members 40, which are six inch by six inch tubes in one commercial embodiment of the invention. These are joined into a rigid, unitary structure by a generally straight cross member 42 at the rear end of the sub-frame and by generally V-shaped cross members 44 at intervals therealong. In the practice of the present invention the details of the sub-frame may be varied from application-to-application, as desired, since they are not of critical import.

Figures 12, 13:
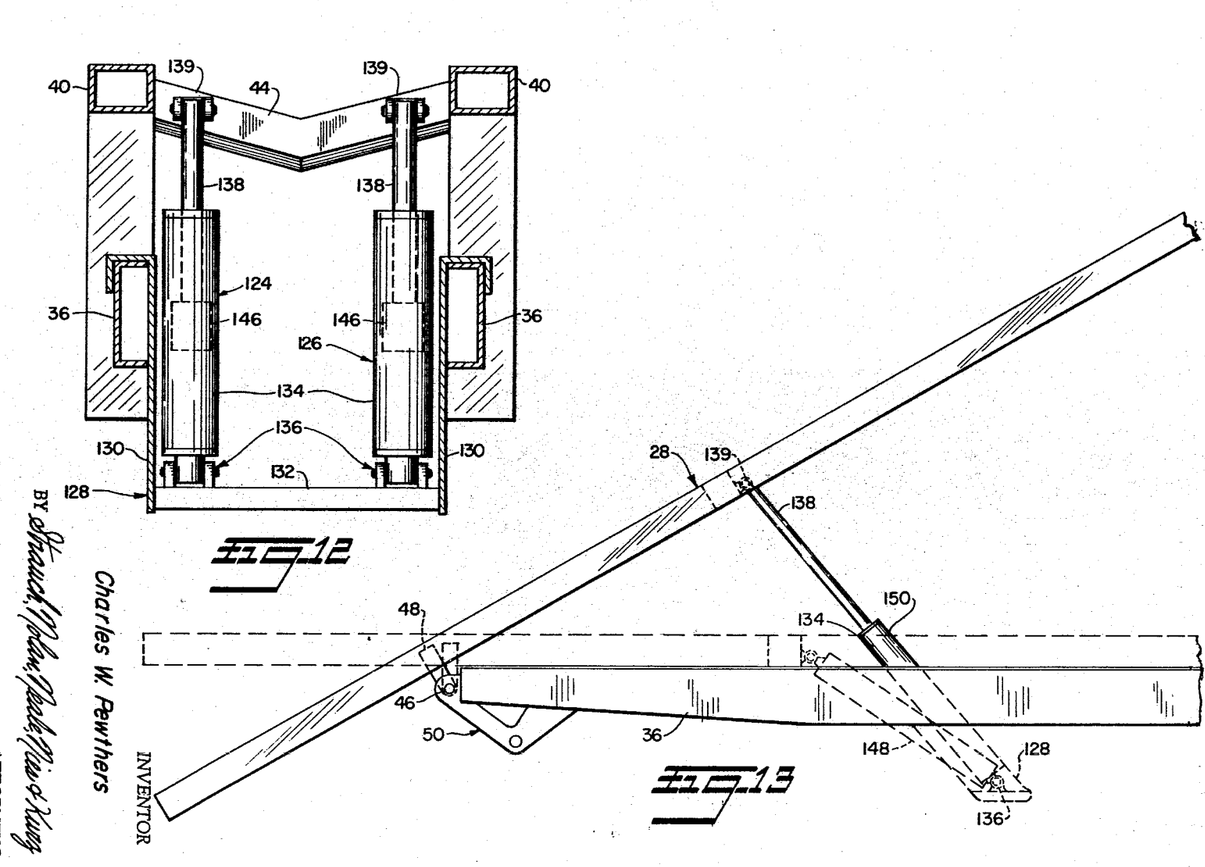
FIGURE 12 is a vertical section through the truck bed, showing a mechanism for pivoting the sub-frame with respect to the vehicle frame and thereby tilting the truck bed.
FIGURE 13 is a side view of the components shown in FIGURE 12 with a number of details omitted for the sake of clarity.
Figures 14, 15, 16, 17:
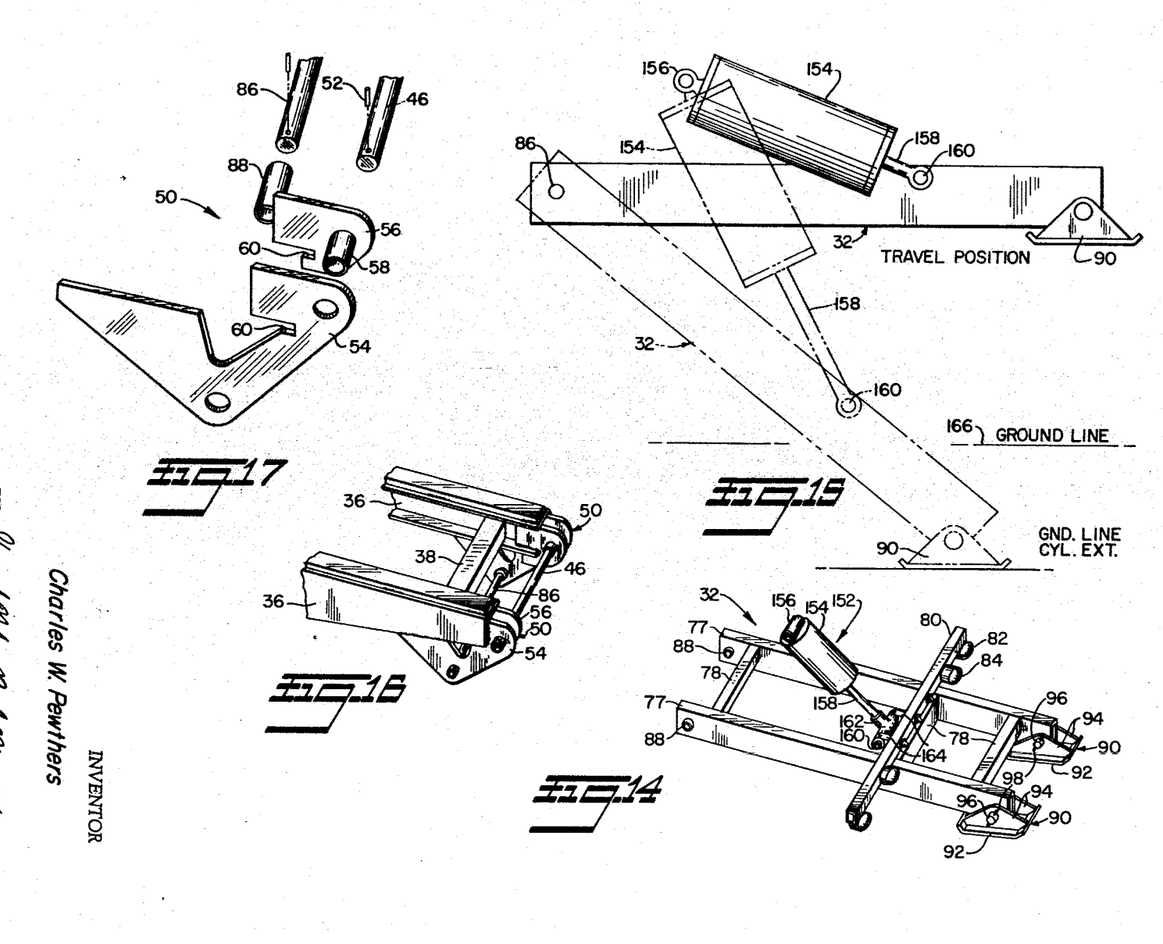
FIGURE 14 is a pictorial view of a novel foot assembly incorporated in load-carrying vehicles in accord with the present invention to raise the rear end of the vehicle and thereby facilitating loading, unloading, and other operations.
FIGURE 15 is a generally schematic side view of the foot assembly.
FIGURE 16 is a pictorial view of the rear end of the load-carrying vehicle frame and the components by which the foot assembly and the sub-frame are supported from the truck frame.
FIGURE 17 is an exploded view of one of the foot assembly supporting components and the pivot members by which the foot assembly and sub-frame are connected to the latter.

As indicated above, sub-frame 28 is pivotally fixed to vehicle frame 22 at the rear end of vehicle 20. As is best shown in FIGURES 13 and 17, this is accomplished by a pivot rod or member 46 which extends through depending ears 48 welded or otherwise attached to longitudinally extending sub-frame structural members 40 and cooperating foot assembly supporting components 50 at the rear end of longitudinal vehicle frame structural members 36 (see also FIGURES 7 and 16). Cotter keys or similar retainers 52 retain pivot rod 46 in place after the sub-frame is assembled to vehicle frame 22.

As shown in FIGURE 17, each of the assemblies or components 50 includes plate-like support members 54 and 56 connected by a tubular spacer 58 through which pivot member 46 extends. After these components are assembled, the assemblies are joined to frame members 36 by welding plates 54 and 56 to the latter with the frame members extending into notches 60 in the plates so that a high strength weld may be made.

Referring still to FIGURE 7, the bed 30 carried by sub-frame 28 is of generally conventional construction and includes a main section 61 fabricated from longitudinally extending structural members 62 which are joined by cross member 64 at the ends of the bed and cross members 66 at intervals therealong. Pockets 68 are preferably provided in structural members 62 and 64 to accommodate a rack (not shown), thereby further enhancing the versatility of the vehicle.

In addition to the components just described, main section 61 of the illustrated exemplary bed 30 includes a floor 69, typically of two inch by six inch tongue and groove yellow pine, surmounted by a floor plate 70 of twelve gauge steel or the equivalent. These specifications may of course be varied as desired.

In addition to main section 61, bed 30 preferably includes a cab protector 71, which may be of generally the same construction as the main section, and a tail gate approach plate 72. Cab protector 71 is pivotally fixed to the front end of the main bed section by an appropriate hinge arrangement (shown in part in FIGURE 7 and identified by reference character 73). Tailgate approach plate 72 is similarly hinged to the rear end of the main bed section and is preferably biased to the vertical position shown in FIGURE 1 by an appropriate spring arrangement (not shown).

Releasable tie members 74 are provided to also maintain cab protector 71 in a vertical position. By releasing these tie bars, however, cab protector 71 can be lowered to the horizontal position shown in FIGURE 2 to increase the length of the bed as will be explained in more detail hereinafter.

Figures 8, 9, 10:
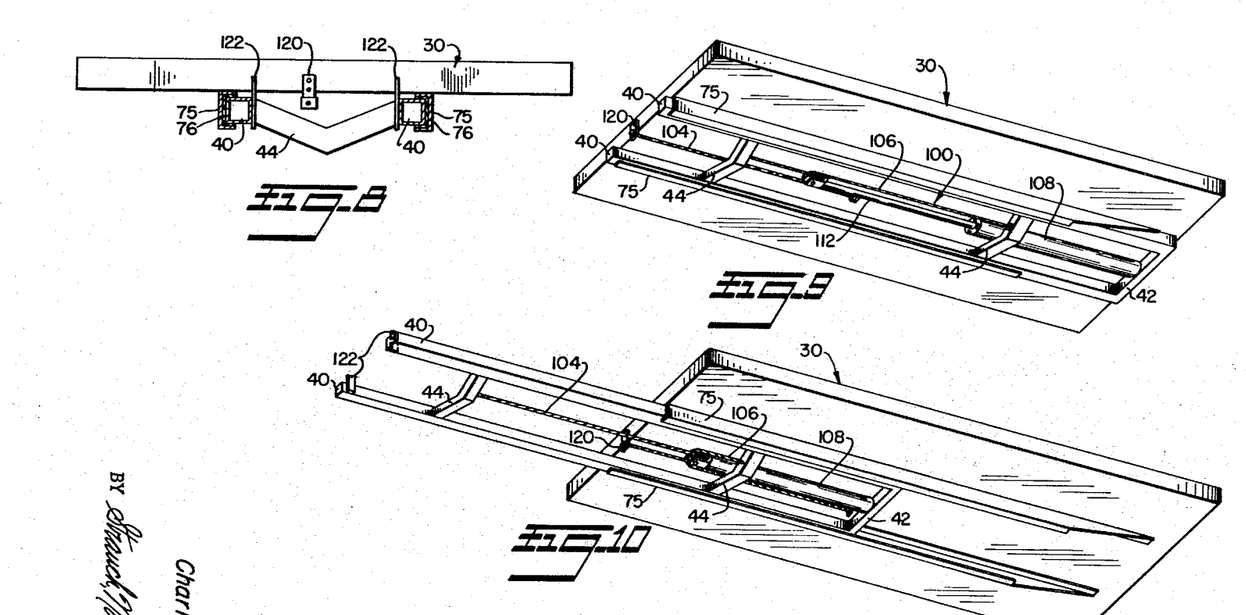
FIGURE 8 is an end view of the vehicle bed and sub-frame.
FIGURE 9 is a pictorial view of the vehicle bed, the sub-frame, and a mechanism for extending and retracting the bed with respect to the sub-frame, the bed being shown in the retracted position.
FIGURE 10 is a view similar to FIGURE 9, but with the bed extended relative to the sub-frame.

Referring now to FIGURES 7–10, bed 30 is slidably mounted on sub-frame 28 by longitudinally extending, channel-shaped guides 75 welded or otherwise attached to the structural members of the bed. As shown in FIGURES 8–10, guides 75 embrace the outer, upper, and lower surfaces of sub-frame longitudinal members 40, confining bed 30 to rectilinear movement relative to the sub-frame. Also, as shown in FIGURE 8, phenolic or similar wear pads 76 are preferably interposed between sub-frame structural members 40 and guides 75 to minimize the friction therebetween as bed 30 is extended and retracted relative to the sub-frame.

The remaining major structural component of vehicle 20, aside from the operating and control systems, is the foot assembly 32 best shown in FIGURES 14 and 15. Referring now to the latter figures, the foot assembly includes a pair of elongated, parallel, spaced apart structural members 77 joined into a rigid, unitary structure by cross members 78. Also attached to members 77 is a transversely extending bar 80 carrying stop and tail lights 82 and 84.

Foot assembly 32 is pivotally fixed to the foot assembly support components 50 at the rear end of vehicle frame 22 by a pivot rod or member 86, which extends through foot assembly structural members 77 and the plate components 54 of the two assemblies. Cylindrical bushings 88 are disposed between pivot rod 86 and support plates 54 to minimize the friction therebetween.

In order to distribute the weight of the vehicle and its load over a sufficiently large area, shoes 90 are incorporated in foot assembly 32. As shown in FIGURE 14, each of the shoes 90 includes a bearing plate 92 to which platelike supporting brackets 94 are fixed in parallel, spaced apart relationship. Shoes 90 are pivotally fixed to the structural members 77 of the foot assembly by pivot pins 96, which extend through the brackets 94 of each shoe and the associated structural member. Pins 98 retain the pivot member in place after the shoe is assembled.

Figure 11:
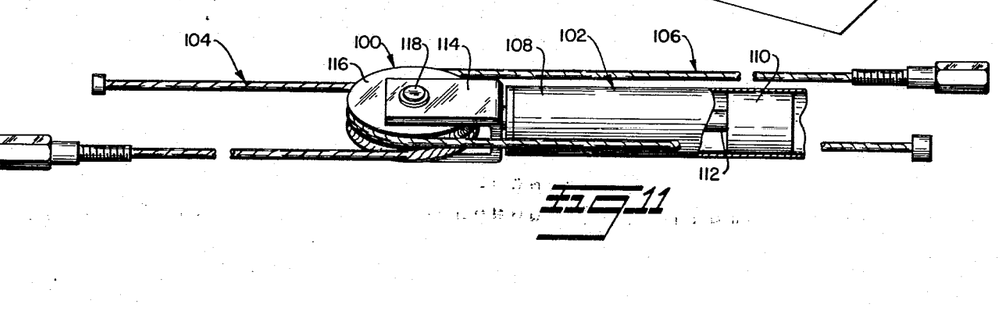
FIGURE 11 is a pictorial view of the bed extending and retracting mechanism.

The versatility of load-carrying vehicle 20 resides in large part in the fact that bed 30 can be tilted and extended rearwardly with respect to the vehicle frame and in that it can be raised by lowering foot assembly 32 to elevate the rear end of the vehicle. Referring now to FIGURES 9–11, it will be remembered that bed 30 is extended and retracted by effecting rectilinear movement of the bed relative to sub-frame 28. The mechanism for accomplishing this, identified generally in the foregoing figures by reference character 100, includes a fluid-operated motor 102, which may be of the hydraulic type, and flexible links 104 and 106, which may be fabricated of wire rope or the like. The cylinder 108 of the hydraulic motor is fixed to the cross member 42 at the rear end of sub-frame 28 and is also supported by the rearmost V-shaped cross member 44 with the V-configuration of the latter providing sufficient room beneath bed 30 to accommodate the motor cylinder.

Motor 102 is of conventional construction, including in addition to cylinder 108 a piston 110 to which a piston rod 112 is attached. Fixed to the free, exterior end of piston rod 112 is a U-shaped bracket 114 in which a double sheaved pulley 116 is rotatably supported by a shaft 118. Flexible link 104 is trained around pulley 116 and connected, at one end, to a bracket 120 fixed to cross member 64 at the front end of bed 30. The opposite end of link 104 is attached to the forwardmost cross member 44 of sub-frame 28.

Flexible link 106 is also trained around pulley 116 but in the opposite direction of link 104. One end of link 106 is fixed by a suitable bracket (not shown) to bed 30 aft of its midpoint, and the other end of this link is fixed to the rearmost V-shaped cross member 44 of the subframe.

To extend bed 30 from the retracted position shown in FIGURE 9 to the extended position shown in FIGURE 10, operating fluid is admitted to the forward end of hydraulic motor cylinder 108, forcing piston 110, piston rod 112, and pulley 116 toward the rear of vehicle 20. As pulley 116 moves rearwardly, it pulls link 104 with it; and the link, in turn, pulls bed 30 rearwardly, moving the bed to the extended position of FIGURE 10.

In a typical application, the amount of travel thus provided will be on the order of twelve feet. This distance can of course be varied as desired.

The operation of mechanism 100 in retracting bed 30 (i.e., moving it from the extended position of FIGURE 10 to the position of FIGURE 9) is similar to that just described. Specifically, to retract the bed, the operating fluid is admitted to the rear end of hydraulic motor cylinder 108, pushing piston 110, piston rod 112, and pulley 116 toward the front of vehicle 20. As pulley 116 moves forwardly, it pushes flexible link 106 toward the front of the vehicle, the link pulling bed 30 with it as it moves forwardly.

Rearward movement of bed 30 is limited by the bottoming of piston 110 in the rear end of hydraulic motor cylinder 108. Forward movement of the bed is limited by bed stops 122 (see FIGURE 7) fixed to the longitudinal structure members 40 of sub-frame 28. As the bed moves forwardly, these stops are engaged by the forwardmost cross member 64 of bed 30, terminating its forward movement (see FIGURE 8).

Figures 1, 2, 3, 4:
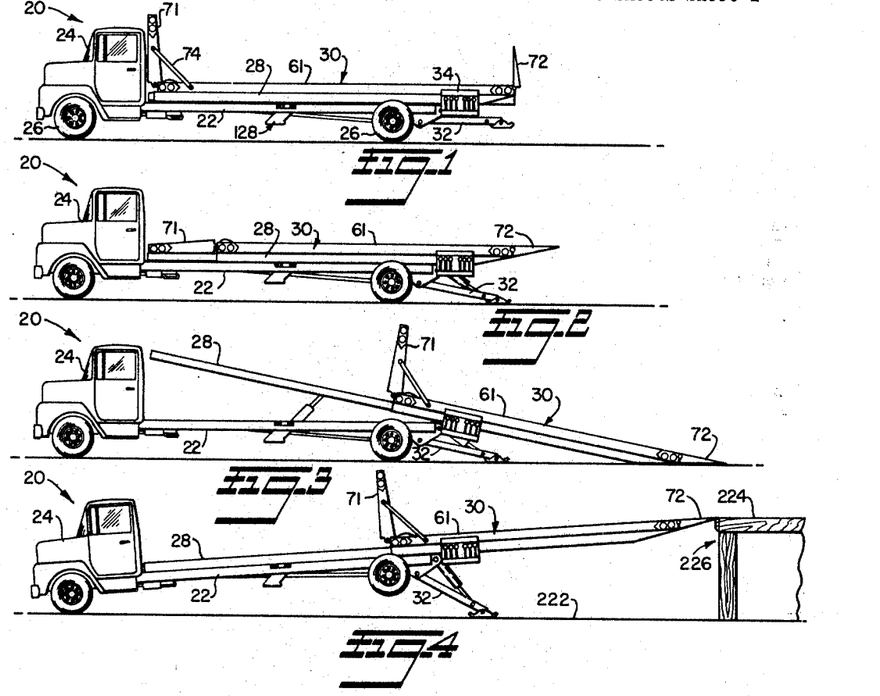
Figure 5:
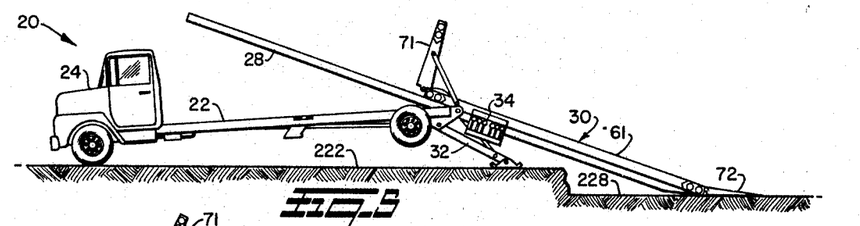
Figure 6:
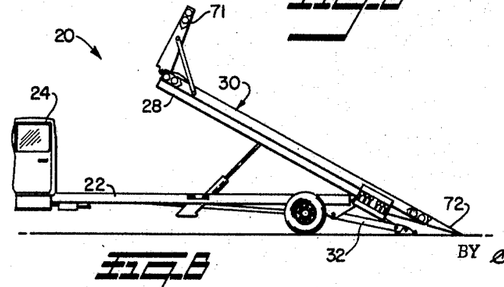

Referring now to FIGURES 1–7, 12, and 13, bed 30 is tilted to the positions shown in FIGURES 3 and 6, for example, by pivoting sub-frame 28 upwardly with respect to vehicle frame 22 about pivot member 46. The mechanism for pivoting the bed includes two hydraulic motors 124 and 126 of the type described previously supported in side-by-side relationship from vehicle frame 22 by a saddle assembly 128. As best shown in FIGURES 7 and 12, the latter component includes depending brackets 130 fixed to the longtiudinal structural members 36 of vehicle frame 22 and a transversely extending support 132 connected between brackets 130 at their lower ends. The cylinders 134 of hydraulic motors 124 and 126 are pivotally fixed to support 132 by hinge assemblies 136.

Referring now to FIGURES 12 and 13, the free or exterior ends of the piston rods 138 of hydraulic motors 124 and 126 are pivotally fixed to a cross member 44 of subframe 28 by hinge assemblies 139. Both these and the hinge assemblies 136 may be of any appropriate construction.

To tilt bed 30 from the normal or lowered position shown in dotted lines in FIGURE 13 to the elevated or raised position shown in full lines in the same figure, operating fluid is admitted to the lower ends of cylinders 134, driving the pistons 146 of the hydraulic motors upwardly together with piston rods 138. As will be apparent from an inspection of FIGURE 13, this rotates sub-frame 28 (and, accordingly, bed 30) upwardly in a counterclockwise direction about pivot member 46. As the bed pivots upwardly, the pivotal connections between the hydraulic motors and support 132 and between the motors and sub-frame 28 accommodate the movement of the motors from the position identified by reference character 148 in FIGURE 13 to that identified by reference character 150.

To return bed 30 from the tilted position to its normal horizontal position, the process just described is reversed by admitting operating fluid to the upper ends of hydraulic motor cylinders 134. This drives the piston 146 and piston rods 138 downwardly, pivoting the sub-frame and bed clockwise to the dotted line, lowered position.

Referring now to FIGURES 14 and 15, the downward pivotal movement of foot assembly 32 employed to elevate the rear end of vehicle 20 and thereby raise bed 30 is also effected hydraulically. More specifically, downward and upward pivotal movement of foot assembly 32 is produced by a fluid-operated motor 152 similar to those described previously. The cylinder 154 of the motor is pivotally supported relative to vehicle frame 22 by the pivot member 46 about which sub-frame 28 rotates, which extends through a cylindrical bracket 156 fixed to the upper end of the cylinder. At the opposite end of the motor, its piston rod 158 is pivotally attached to the center cross member 78 of the foot assembly by a pivot member 160. The latter extends through a cylindrical attachment 162 fixed to the end of the piston rod and brackets 164 welded or otherwise fixed to the cross member.

To lower foot assembly 32 from the travel position shown in full lines in FIGURE 15 to a position in which it elevates the rear end of vehicle 20 from the surface 166 on which the vehicle is standing, operating fluid is admitted to the upper end of cylinder 154, driving the piston (not shown) of the motor and piston rod 158 downwardly. As is apparent from FIGURE 15, this pivots the foot assembly in a clockwise direction about pivot member 86 from the full line travel position to the position shown in dotted lines. As in the case of the bed tilting mechanism, the pivotal connections between the hydraulic motor and the components to which it is connected accommodate movement of motor 152 as the foot assembly is lowered with the motor moving from the position shown in full lines in FIGURE 15 to that shown in dotted lines as the foot assembly pivots through the clockwise path just described.

As mentioned previously, foot assembly 32 may be employed to stabilize vehicle 20 during loading, unloading, and other operations as well as to elevate the rear end of the vehicle from the supporting surface. When only stabilization of the vehicle is involved, the flow of operating fluid to hydraulic motor 152 is simply terminated as soon as the ground engaging shoes 90 of the foot assembly reach ground line 166.

To return foot assembly 32 to the travel position shown in full lines in FIGURE 15, the process just described is reversed by admitting operating fluid to the lower end of hydraulic motor cylinder 154. This drives the motor piston and piston rod 158 upwardly, pivoting the foot assembly in a counterclockwise direction from a lowered to its travel position.

Figure 18:
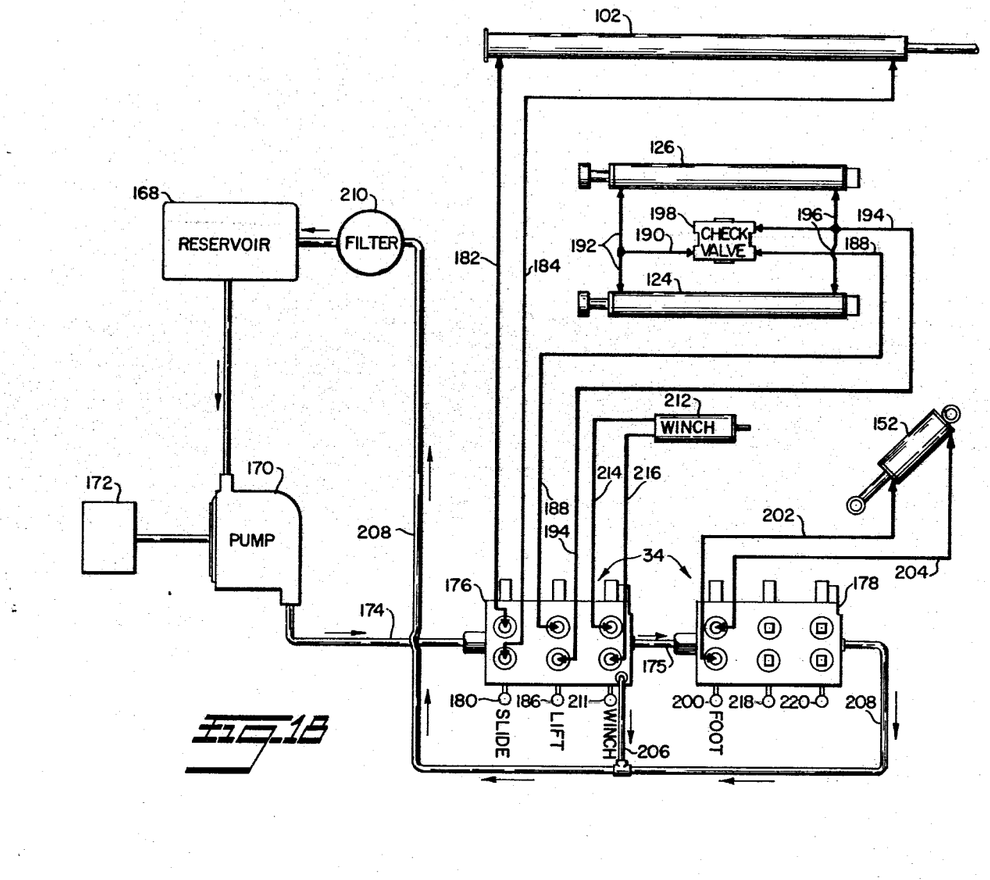
FIGURE 18 is a circuit diagram and schematic illustration of the hydraulic system preferably employed to operate the various mechanisms illustrated in FIGURES 1–17 and the controls therefor.

Referring now to FIGURE 18, the system for supplying hydraulic operating fluid to the various operating mechansims described above includes, in addition to control mechanism 34, a hydraulic reservoir 168 and a hydraulic pump 170, which may be driven by the power takeoff 172 of vehicle 20. The outlet of pump 170 is connected by hydraulic lines 174 and 175 to control 34 which, in the exemplary embodiment of the invention described herein, consists of two conventional three-spool, four-way valve banks 176 and 178. These are preferably mounted on the side of sub-frame 28 near the rear of the sub-frame as shown in FIGURE 1. This location permits the operator to closely observe the movement of the bed as he manipulates the controls. A cover (not shown) can be provided to protect these controls from dust, rain, etc. when not in use, if desired, inasmuch as they are in a relatively exposed location.

As shown in FIGURE 18, valve bank 176 includes an operating lever 180 for connecting hydraulic fluid line 174 to the forward and rear ends of hydraulic motor 102 through hydraulic lines 182 and 184, respectively, to extend and retract the bed. A second operating lever 186 can be manipulated to connect line 174 to the upper and lower ends of hydraulic motors 124 and 126 through hydraulic lines 188–196 to tilt bed 30 upwardly and to lower it to its normal, horizontal position.

As shown in FIGURE 18, a check valve 198 is interposed in the hydraulic lines connected to motors 124 and 126. This is an important safety feature in that it prevents fluid from flowing out of the hydraulic motors and allowing the bed to drop if there is a failure in the hydraulic system when the bed is in an elevated or tilted position.

A third operating lever 200 in valve bank 178 is provided to connect hydraulic line 174 to foot assembly operating motor 152 through hydraulic lines 202 and 204. This permits the foot assembly to be raised and lowered in the manner described previously.

To complete the hydraulic circuit, the hydraulic lines between the motors shown in FIGURE 18 are connectable by operating levers 180, 186, and 200 to hydraulic lines 206 and 208 which, in turn, are connected through a filter 210 back to hydraulic fluid reservoir 168. These connections permit the operating fluid to drain from one end of a motor while it is being admitted to the other.

As mentioned previously, one of the significant advantages of an operating system of the type just described is that it may readily be employed to power not only the vehicle components described above but, also, auxiliary equipment such as winches and the like. For example, as shown in FIGURE 18, the third operating lever 211 in valve bank 176 may be employed to control the flow of hydraulic fluid to a conventional, hydraulically operated winch 212 connected to the valves controlled by lever 211 through hydraulic lines 214 and 216. The operating levers 218 and 220 in valve bank 178 may be similarly utilized to regulate the operation of other auxiliary equipment (not shown).

One of the important advantages of the present invention, as discussed above, is the versatility resulting from the variety of positions to which bed 30 can be manipulated. For example, FIGURE 1 shows vehicle 20 with bed 30 retracted and cab protector 71 and tailgate approach plate 72 in their normal vertical positions. Foot assembly 32, in this figure, is in its normal or retracted position. This is one configuration which the vehicle could assume for travelling, either empty or loaded.

In the configuration of vehicle 20 shown in FIGURE 2, bed 30 has been partially extended (i.e., moved rearwardly); and cab protector 71 and tailgate approach plate 72 have been lowered to increase the length of the bed. In one commercial application of the principles of the present invention, cab protector 71 is approximately four feet tall and tailgate approach plate 72 approximately nineteen inches high so that lowering of these components to the horizontal position of FIGURE 2 increases the length of the bed by approximately five and one-half feet.

FIGURE 3 shows vehicle 20 in a configuration for loading or unloading machinery, automobiles, or for loading the vehicle with a forklift or the like. In this configuration bed 30 is titled upwardly to its load angle (approximately 11°), and foot assembly 32 is lowered to stabilize the vehicle. Cab protector 71 remains up but tailgate approach plate 72 is lowered to permit the machinery, et cetera to be pulled onto bed 30 by winch 212 or driven onto the bed. Once the vehicle is loaded, the bed is lowered and retracted and foot assembly 32 raised to the travelling position.

For loading from a dock or the like, vehicle 20 may be positioned as shown in FIGURE 4. In this type of operation, bed 30 is extended and foot assembly 32 is lowered to raise the rear end of vehicle 20 off of the surface 222 on which it is standing until tailgate approach plate 72 is level with the horizontal surface 224 of the dock 226. This permits the load to be moved directly from dock 226 onto vehicle bed 30. Once this is accomplished, the bed is retracted, foot assembly 32 returned to its travel position, and tailgate approach plate raised to ready vehicle 20 for travelling.

In a number of operations, it is desirable to have the end of the bed below the level on which the vehicle is standing. When this is desired, the vehicle is positioned as shown in FIGURE 5 with foot assembly 32 lowered to raise the rear end of the vehicle above ground level 222. Bed 30 is then tilted upwardly and extended until tailgate approach plate 72 reaches the lower level 228.

In addition to the load angle or position shown in FIGURE 3, bed 30 can also be raised to a dump angle or position in which the surface of the bed is at an angle of up to 28° from the horizontal. The dump position is shown in FIGURE 6. In this case bed 30 is kept in the retracted position so that it may be elevated to a greater extent, and foot assembly 32 is lowered to an extent sufficient to stabilize the vehicle. As in the other configurations, tailgate approach plate 72 is lowered.

Another type of operation in which the versatility of the present invention is extremely useful is in the unloading of long, heavy objects. In the past this has typically required the use of a crane or other unloading equipment. Because of the versatility of the novel vehicle beds described herein, in contrast, such equipment is not necessary; and objects of the type just mentioned can be readily unloaded.

Specifically, in unloading long objects vehicle bed 30 is titled upwardly as described above until it reaches an angle at which the object to be unloaded will slide down the bed by gravity. The bed is then extended until tailgate approach plate 72 lies on the surface on which vehicle 20 is standing. Then, the object to be unloaded is allowed to slide down the bed onto the tailgate approach plate with this movement being controlled by winch 212 to prevent damage to it.

With the lower end of the object being unloaded resting on the approach plate, foot assembly 32 is lowered to stabilize the vehicle and prevent it from moving, and bed 30 is retracted from under the load, an operation facilitated by the airfoil shape of the tailgate approach plate which permits it to be readily withdrawn from under the load.

In the case of a long load one end of the load will at this point be resting on the ground and the other on the truck bed. The next step is to retract foot assembly 32 and further tilt and extend bed 30 by operation of motors 124 and 126. With the foot assembly retracted this raises the rear end of the vehicle and permits the vehicle to roll ahead. The rear end is then lowered and the bed again retracted in the manner described above, which results in the forward end of the object being moved into engagement with the bed at a point closer to the rear end of the vehicle since its rear end remains stationary while the vehicle has moved forward. The cycle is repeated as many times as necessary until the forward end of the object is lowered to the surface on which the vehicle is standing.

The foregoing is merely one example of how the versatility of the present invention may be taken advantage of in the handling of objects which are difficult to load and/or unload. Other equally sophisticated operational sequences can of course be utilized in the handling of other loads of this nature.

In conjunction with the foregoing it will be apparent from the description of the sequence of steps in the unloading operation and the drawing that no harmful bending or other stresses are imposed on the components involved during any of the steps of the operation. Any attempt to use previously known arrangements such as those described above, even if it were possible (which it is not), would certainly result in stress loads capable of seriously damaging various ones of their components. In short one of the important features of the present invention is not only the flexibility of motion provided but, also, the arrangement of components in such a fashion that they can be manipulated under load to different positions such as those described above without bending moments or harmful stresses being imposed upon them.

As will be apparent to those skilled in the arts to which the present invention pertains from the foregoing description of an exemplary embodiment, vehicles in accord with the present invention have a degree of versatility not heretofore attainable. Such versatility can be even further increased for particular applications by, for example, adding a rack as suggested above, a lift, or an over-the-cab carrier to increase the carrying capacity of the vehicle. These and other modifications of the illustrated embodiment of the invention are accordingly fully intended to be covered in the appended claims to the extent that they are not expressly excluded therefrom.

What is claimed and desired to be secured by Letters Patent is:

1. The combination of a vehicle having a frame; a sub-frame; a bed slidably carried by said sub-frame; a foot assembly pivotally fixed to said vehicle frame at the rear end thereof; means including a first fluid-operated motor for tilting the bed by pivoting said bed upwardly relative to said vehicle frame; means including a second fluid-operated motor for extending said bed relative to the vehicle frame by effecting sliding movement of the bed relative to the sub-frame; means including a third fluid-operated motor for pivoting said foot assembly downwardly relative to the vehicle frame and into engagement with the surface on which the vehicle is standing, said sub-frame being pivotally fixed to said sub-assembly, whereby operation of said third fluid motor to effect downward pivotal movement of said foot assembly causes said foot assembly to contact said surface and elevate the entire rear end of said vehicle above said surface irrespective of the positions of the sub-frame and slidable bed relative to the vehicle frame; and means for selectively and independently operating each of said first, second, and third fluid-operated motors.

2. The combination of claim 1, wherein said first fluid-operated motor provided for tilting said bed relative to the vehicle frame includes a cylinder component and a piston rod component extensible from and retractible into said cylinder component, one of the aforesaid motor components being pivotally fixed to said sub-frame and the other of said motor components being pivotally fixed to the vehicle frame.

3. The combination of claim 1, together with a depending saddle assembly fixed to the vehicle frame, the vehicle frame associated component of said first fluid-operated motor being pivotally supported from said saddle assembly.

4. The combination of claim 1, wherein the means for tilting the bed relative to the vehicle frame includes a fourth fluid-operated motor disposed in parallel, spaced apart relationship to said first motor and connected in parallel between said sub-frame and said vehicle frame with said first motor.

5. The combination of claim 1, wherein said first, second, and third fluid-operated motors are of the type having a hydraulic cylinder and wherein the means for operating said motors includes a pump for pumping hydraulic fluid to said motors, hydraulic lines connecting said pump to the cylinders of said motors, and selectively operable valve means for controlling the flow of hydraulic fluid from said pump to said hydraulic motors, said valve means being mounted on said sub-frame.

6. The combination of claim 1, wherein said foot assembly comprises a pair of elongated structural members disposed in parallel, spaced apart relationship and transversely extending structural members joining the first-mentioned structural members into a unitary structure; wherein the foot assembly is pivotally fixed to the vehicle frame by pivot members extending through said first-mentioned structural members at one end of the foot assembly; and wherein there are ground-engaging support members pivotally fixed to said first-mentioned structural members at the opposite end of the foot assembly.

7. The combination of claim 6, including a pair of depending foot assembly supporting components fixed to said vehicle frame in parallel, spaced apart relationship, said pivot members extending through said components and thereby pivotally fixing said foot assembly to said vehicle frame.

8. The combination of a vehicle having a frame; a sub-frame; a bed slidably carried by said sub-frame; a foot assembly pivotally fixed to said vehicle frame at the rear end thereof; means including a first fluid-operated motor for tilting the bed by pivoting said bed upwardly relative to said vehicle frame; means including a second fluid-operated motor for extending said bed relative to the vehicle frame by effecting sliding movement of the bed relative to the sub-frame; means including a third fluid-operated motor for pivoting said foot assembly downwardly relative to the vehicle frame and into engagement with the surface on which the vheicle is standing, said sub-frame being pivotally fixed to said sub-assembly, whereby operation of said third fluid motor to effect downward pivotal movement of said foot assembly causes said foot assembly to contact said surface and elevate the entire rear end of said vehicle above said surface irrespective of the positions of the sub-frame and slidable bed relative to the vehicle frame; means for selectively and independently operating each of said first, second, and third fluid-operated motors; and selectively operable means for extending and retracting said bed relative to the vehicle frame by effecting sliding movement of the bed relative to the sub-frame, said last-named means including a fourth fluid-operated motor having a cylinder, a piston in said cylinder, and a piston rod fixed relative to the piston and extending from the cylinder; a guide member fixed to said piston rod; first and second flexible links trained in opposite directions around said guide, the ends of the first link being fixed respectively to said sub-frame and said bed at one end thereof and the ends of said second link being fixed respectively to said sub-frame and said slidable bed at the opposite end thereof, and selectively operable means for admitting operating fluid to the cylinder on one and on the other side of said piston.

9. The combination of claim 8, wherein said sub-frame comprises longitudinal structural members and cross members joining said longitudinal members into a unitary structure and wherein the cylinder of the fluid-operated motor is mounted on said cross members and including longitudinally extending guide members fixed to the underside of said bed, said guide members engaging like sides of the longitudinal structural members of the sub-frame and thereby confining said bed to rectilinear movement relative to the sub-frame, and stop means for limiting the sliding movement of the bed relative to the sub-frame.

10. The combination of a vehicle having a frame; a sub-frame; a bed slidably carried by said sub-frame; a foot assembly pivotally fixed to said vehicle frame at the rear end thereof; means including a first fluid-operated motor for tilting the bed by pivoting said bed upwardly relative to said vehicle frame; means including a second fluid-operated motor for extending said bed relative to the vehicle frame by effecting sliding movement of the bed relative to the sub-frame; means including a third fluid-operated motor for pivoting said foot assembly downwardly relative to the vehicle frame and into engagement with the surface on which the vehicle is standing, said sub-frame being pivotally fixed to said sub-assembly, whereby operation of said third fluid motor to effect downward pivotal movement of said foot assembly causes said foot assembly to contact said surface and elevate the entire rear end of said vehicle above said surface irrespective of the positions of the sub-frame and slidable bed relative to the vehicle frame; and means for selectively and independently operating each of said first, second, and third fluid-operated motors; said bed having a first section confined to rectilinear movement relative to the sub-frame and a second section adapted to be positioned at right angles to the first section to provide a vertically extending end for the bed, said second section being pivotally fixed to the first section, whereby said bed can be extended relative to said sub-frame and said second bed section pivoted from its vertical to a generally horizontal position to increase the length of the bed; and means for releasably latching said second bed section in the position in which it is disposed at right angles to said first bed section.

11. The combination of claim 10, together with a third bed section pivotally fixed to the first bed section at the end thereof opposite the first bed section and adapted to be disposed at right angles to the first bed section to provide a vertically extending end for said bed at the end thereof opposite the second bed section.

References Cited

UNITED STATES PATENTS

| 1,711,565 | 5/1929 | Hatfield et al. | |
| 2,468,502 | 4/1949 | Lisota | 214—505 |
| 2,588,001 | 3/1952 | Holland | 214—505 |
| 2,831,588 | 4/1958 | Seed. | |
| 3,034,674 | 5/1962 | Bertoglio et al. | 214—517 |

FOREIGN PATENTS

| 260,213 | 5/1964 | Australia. |
| 26,625 | 12/1963 | Germany. |

ALBERT J. MAKAY, Primary Examiner

U.S. Cl. X.R.

214—83.24